Aug. 18, 1953 — T. P. BUDZYNA — 2,648,959
DUSTPAN
Filed May 16, 1951
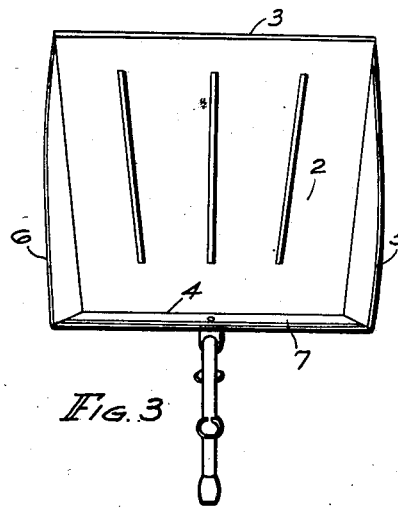
Fig. 3
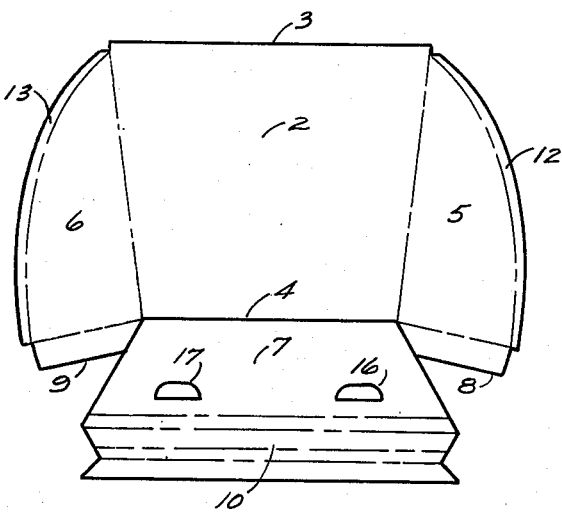
Fig. 4
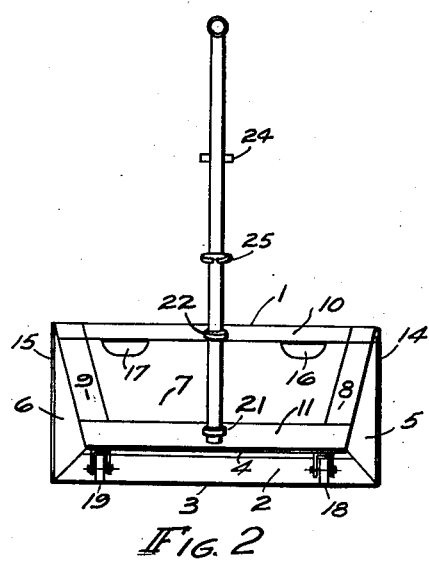
Fig. 2
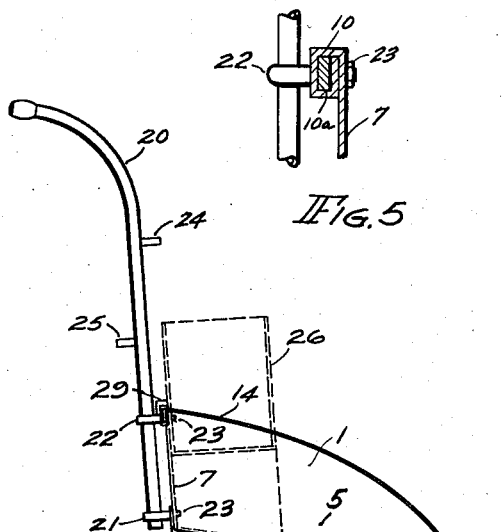
Fig. 5 / Fig. 1
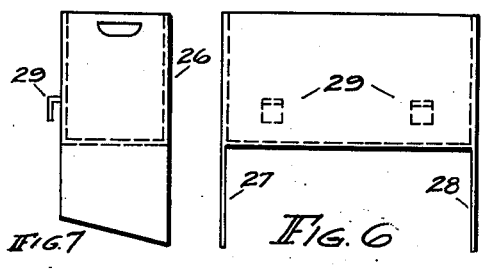
Fig. 7 / Fig. 6
Inventor
THEODORE P. BUDZYNA
By Chas. H. Richards
Attorney Patented Aug. 18, 1953

2,648,959

UNITED STATES PATENT OFFICE 2,648,959

DUSTPAN

Theodore P. Budzyna, Worcester, Mass.

Application May 16, 1951, Serial No. 226,714

1 Claim. (Cl. 65—20)

My invention relates to dust pans and especially dust pans used in large establishments such as factories, offices, department stores and the like.

It is an object of this invention to provide an industrial dust pan so designed that it has ease of mobility even when filled with sweepings.

It is another object of this invention to provide a dust pan body, formed from a single sheet of metal, with beaded sides and reinforced back, said sides and back being at an obtuse angle to the bottom and to each other.

It is another object of this invention to provide an industrial dust pan with sides and back at an obtuse angle to the bottom of the pan and the sides also flaring outwardly from the back toward the open front edge making it easy to fill with large quantities of heavy sweepings.

It is still a further object of this invention to provide a strong, light industrial dust pan with means whereby it can be readily emptied.

It is still a further object of this invention to provide an industrial dust pan with a removable receptacle whereby certain waste materials can be separated from the floor sweepings by being placed in the receptacle and the floor sweepings can be brushed into the pan thus leaving a clean floor.

Other objects and advantages of this invention will be apparent from the following detailed description taken in conjunction with the accompanying drawings in which Fig. 1 is a side elevation of the dust pan of this invention.

Fig. 2 is a rear view of the dust pan.

Fig. 3 is a plan view of the dust pan.

Fig. 4 is a development of the dust pan blank prior to being formed.

Fig. 5 shows a bracket fastened to the back of the pan for holding a handle.

Fig. 6 is a front view of a separate receptacle for use with the dust pan.

Fig. 7 is a side view of the receptacle showing hooks on the back.

The drawings show a dust pan 1 consisting of a bottom section 2 which is wider at the front edge 3 than it is at the rear 4. The sides 5 and 6 and back 7 are an integral part of the bottom 2 as shown in Fig. 4. The sides have welding and reinforcing strips 8 and 9 at their rear edges so that when the back and sides are bent into position the strips 8 and 9 are welded substantially to the entire length of the rear side of the back 7. The back 7 has a reinforcing strip 10 which is bent over the back and welded in position as shown in Figs. 2 and 5. It is to be noted that the reinforcing strip 10, Fig. 5, is bent around a filler piece 10a. A separate reinforcing strip 11 is welded on the bottom and the back to reinforce the corner formed by the bottom and back and also to be used for purposes which will presently be explained.

The sides have bead strips 12 and 13, Fig. 4, which are formed into rolled edges along the top of the sides to perform two functions namely: to strengthen the sides and to provide safety edges 14 and 15, Figs. 1 and 2, to eliminate the danger of a person being accidentally cut thereby.

It is to be particularly noted that when the pan 1 is formed as shown in Figs. 1, 2 and 3, that the sides 5 and 6 and the back 7 are an obtuse angle to the bottom 2 and that the sides also flare out from the back. This construction makes it easy to fill or empty the pan and in order to facilitate the emptying, the back 7 has apertures 16 and 17 therein, to form handholds, 16 and 17 therein.

The pan is provided with casters 18 and 19, fastened to the bottom of the pan on the reinforcing strip 11, which not only make the pan mobile but also furnish a fulcrum whereby the pan can be readily tipped to lift the front edge from the floor by means of a handle 20. The handle 20 is received in a pair of substantially annular brackets 21 and 22, which are fastened to the back of the pan by means of screws 23 (Figs. 1 and 5) which pass through the respective upper and lower reinforcing strips 10 and 11. At their inner ends, said screws bear against the handle 20, thereby to hold the latter within the brackets 21 and 22, at the desired adjusted vertical height, relative to the pan. By rearwardly curving the upper portion of the handle as shown in Fig. 1, it is possible to tip the pan away from the floor when full, with the minimum amount of exertion thereby reducing operator fatigue.

A pair of clips 24 and 25 are fastened to the handle 20 to provide means for holding a broom and a hand brush, thereby making an efficient self contained cleaning unit.

In many places it is desirable to keep certain types of waste material separate from the floor sweepings and in order to do this a removable can 26, having legs 27 and 28, is provided as shown in Figs. 6 and 7 and in dotted lines in Fig. 1. Hooks 29 are secured to the back of the can 26 and these fit over the back 7 of the dust pan to keep the can from sliding out of the pan. By having the can 26 on legs at each side the capacity of the dust pan is not materially reduced.

Having thus fully described my invention, what I claim new and desire to secure by Letters Patent is:

In a dust or rubbish pan of the class described, a pan body formed from a single piece of sheet metal, cut and bent to provide a bottom, a rear wall, and a pair of side walls, the latter having rearward extensions bent about the side edges of said rear wall and welded thereto, a reinforcing strip of angular cross section welded to said bottom and to said rear wall at the juncture thereof, casters attached to the underlying portion of said strip, a substantially flat reinforcing strip enclosed by folds of the upper edge of said rear wall, to lie in substantially parallel relation to rearward portion of said first strip, a pair of vertically alined annular brackets, associated respectively with said substantially parallel strip portions, a threaded member extending through each of the latter for attachment thereto of its associated bracket, and a handle member for said pan, passing through both of said brackets and held in the desired position of vertical adjustment by said threaded members.

THEODORE P. BUDZYNA.

References Cited in the file of this patent

UNITED STATES PATENTS

| Number | Name | Date |
|---|---|---|
| 67,019 | Brigham | July 23, 1867 |
| 112,102 | Whittemore | Feb. 21, 1871 |
| 398,997 | Bailey | Mar. 5, 1889 |
| 497,401 | Bates | May 16, 1893 |
| 502,296 | Hiatt | Aug. 1, 1893 |
| 577,452 | Richardson | Feb. 23, 1897 |
| 675,052 | Carlson | May 28, 1901 |
| 721,365 | Green | Feb. 24, 1903 |
| 768,871 | Albertson | Aug. 30, 1904 |
| 771,134 | Erickson | Sept. 27, 1904 |
| 1,084,127 | Beecher | Jan. 13, 1914 |
| 1,191,945 | Carlson | July 25, 1916 |
| 1,270,340 | Spaulding | June 25, 1918 |
| 1,355,577 | Sperling | Oct. 12, 1920 |
| 1,598,168 | Stosser | Aug. 31, 1926 |
| 1,742,735 | Strippel | Jan. 7, 1930 |
| 1,982,849 | Badger | Dec. 4, 1934 |
| 1,990,026 | Glen | Feb. 5, 1935 |
| 2,172,808 | Roy | Sept. 12, 1939 |
| 2,433,886 | Bremer | Jan. 6, 1948 |
| 2,437,029 | Howard | Mar. 2, 1948 |
| 2,438,596 | Arave et al. | Mar. 30, 1948 |
| 2,455,695 | Monaco | Dec. 7, 1948 |